(12) United States Patent
Katayanagi

(10) Patent No.: US 7,400,906 B2
(45) Date of Patent: Jul. 15, 2008

(54) MOBILE COMMUNICATION TERMINAL

(75) Inventor: Takeshi Katayanagi, Tokyo (JP)

(73) Assignee: NEC Corporation (JP)

( * ) Notice: Subject to any disclaimer, the term of this patent is extended or adjusted under 35 U.S.C. 154(b) by 436 days.

(21) Appl. No.: 11/132,336

(22) Filed: May 19, 2005

(65) Prior Publication Data
US 2005/0266885 A1 Dec. 1, 2005

(30) Foreign Application Priority Data
May 25, 2004 (JP) ............................. 2004-154022

(51) Int. Cl.
*H04Q 7/20* (2006.01)
(52) U.S. Cl. ...................... 455/558; 455/556.1; 455/557
(58) Field of Classification Search ................. 455/558, 455/557, 406, 407, 408, 410, 411, 415, 414.1, 455/432.1, 433, 435.2, 435.1; 235/380, 492; 710/72, 62; 340/5.6, 5.74; 705/67
See application file for complete search history.

(56) References Cited

U.S. PATENT DOCUMENTS

| | | | |
|---|---|---|---|
| 6,141,563 A | 10/2000 | Miller et al. | |
| 6,148,192 A | 11/2000 | Ahvenainen | |
| 6,195,568 B1 | 2/2001 | Irvin | |
| 2002/0065106 A1* | 5/2002 | Bishop et al. | ............... 455/558 |
| 2002/0188736 A1* | 12/2002 | Jarvensivu | ................... 709/229 |
| 2003/0055792 A1* | 3/2003 | Kinoshita et al. | ............. 705/67 |
| 2003/0069040 A1* | 4/2003 | Chuang et al. | .............. 455/558 |
| 2003/0139148 A1* | 7/2003 | Damgaard et al. | ............ 455/86 |
| 2004/0259541 A1* | 12/2004 | Hicks et al. | .............. 455/426.1 |

FOREIGN PATENT DOCUMENTS

| | | |
|---|---|---|
| EP | 0607767 | 7/1994 |
| JP | 2002 199 089 | 7/2002 |
| JP | 2033-264631 | 9/2003 |
| JP | 2004-064657 | 2/2004 |
| JP | 2004-088235 | 3/2004 |

* cited by examiner

*Primary Examiner*—Jean A Gelin
(74) *Attorney, Agent, or Firm*—Dickstein, Shaipro, LLP.

(57) ABSTRACT

With a mobile communication terminal, normal call is enabled by installing a predetermined IC card. When an IC card is installed into the terminal, verification of an identifier of the IC card and verification of personal information corresponding to the identifier are performed. If the verifications have succeeded, the mobile communication terminal is customized in accordance with the personal information. A user performs communication by using his/her personal information and accessible information in a storage unit. At the time of identifier authorization operation, notification of whether or not the authorization operation has succeeded and of the identifier is provided to a predetermined administrator. When a certain mobile communication terminal is used by a plurality of users, personal information of each user is protected, operability of the terminal is improved, and the administrator can keep track of usage state of the terminal.

17 Claims, 2 Drawing Sheets

MOBILE COMMUNICATION TERMINAL

BACKGROUND OF THE INVENTION

1. Field of the Invention

The present invention relates to a mobile communication terminal, and more particularly to a mobile communication terminal in which a card is installed, and which operates in accordance with information stored in the card.

2. Description of the Related Art

As mobile communication terminals, such as a mobile phone, a Personal Handy phone System (PHS) and a Personal Digital Assistant (PDA), there is a terminal in which communication is enabled by installing an IC card. As such IC cards, known are a Subscriber Identity Module (SIM) card, a Universal Subscriber Identity Module (USIM) card and the like. The SIM card is an IC card which is used in a mobile communication terminal based on Global System for Mobile communication (GSM), which is standardized in Europe. On the other hand, the USIM card is an IC card which is adopted in International Mobile Telecommunication System 2000 (IMT-2000), which is a standard of the third generation mobile phone. The above-described IC cards store conditions and data concerning communication, such as telephone numbers, and customize the mobile communication terminal.

A user of the mobile communication terminal can have a plurality of IC cards and customize the terminal for business use or for private use. As another usage example, if a plurality of people use a certain mobile communication terminal, each person can have his/her own IC card, and customize the terminal by installing the card therein. However, when an IC card is lost, personal information could be easily known by others. Accordingly, there are disclosed various security technologies concerning IC cards. According to JP2003-264631 A, if an identification code of an IC card (a SIM card) which is installed in a mobile communication terminal is not stored in the mobile communication terminal, information stored in the SIM card is sent to a predetermined address, and the information stored in the SIM card is automatically deleted. According to JP2004-064657 A, if a SIM card installed in a communication terminal does not match the terminal, sending and receiving operations are disabled. In JP2004-088235 A, an IC card utilization technology is disclosed. In this technology, when a user uses a plurality of telephones, using one IC card, the communication history is cumulatively stored in the IC card.

When the user installs a SIM card into the mobile phone and makes a telephone call, telephone numbers and/or email addresses stored in the SIM card is recorded into the mobile phone. The user has to delete the personal information, such as telephone numbers, recorded in the mobile phone before the user hands the mobile phone which the user used to another person. Also In the case where the above-described user allows the personal information to be disclosed and does not delete the information, the telephone numbers which the next user of the mobile phone will not use remain in the directory. As a result, convenience will be lowered. In addition, in the prior art, there has not been proposed the technology to determine who is using the shared mobile phone.

SUMMARY OF THE INVENTION

A mobile communication terminal according to the present invention to solve the above-described problems performs communication in a state where a card which stores information is installed therein. The mobile communication terminal includes: a control unit controlling operations of the mobile communication terminal; and a storage unit. The terminal further includes: determination means for determining whether or not identification information of the card is retained in the storage unit and whether or not personal information corresponding to the identification information is retained in the storage unit; configuration means for configuring operations of the mobile communication terminal in accordance with a determination result of the determination means; and notification means for providing notification corresponding to the determination result to a predetermined party.

In addition, a method of operating a mobile communication terminal according to the present invention includes the steps of: determining whether identification information stored in the installed card is retained in a storage unit of the mobile communication terminal; if the identification information is retained in the storage unit, sending the fact and the identification information to a predetermined party; determining whether personal information corresponding to the identification information is retained in the storage unit; and if the personal information is retained in the storage unit, configuring the mobile communication terminal in accordance with the personal information.

The present invention prevents unauthorized use of a mobile communication terminal performing communication in a state where a card is installed therein, as well as prevents leakage of personal information. Moreover, the present invention improves operability of a terminal, and makes it possible for a terminal administrator to easily keep track of usage state of the terminal.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
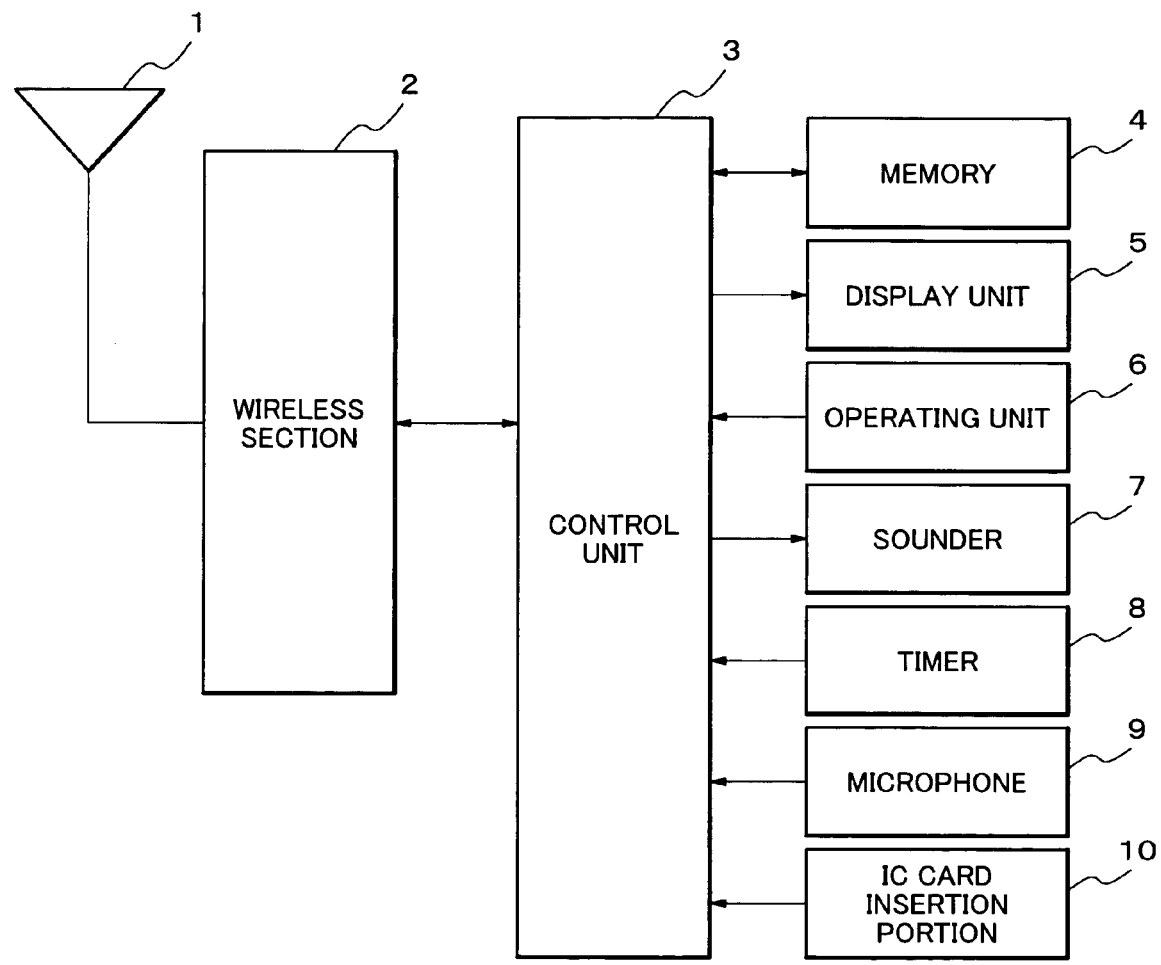
FIG. 1 is a block diagram of a mobile communication terminal of an embodiment of the present invention.

As a preferred embodiment of a mobile communication terminal of the present invention, an example of a mobile phone will be described below. Referring to FIG. 1, the mobile phone includes an IC card insertion portion 10 to which an IC card, such as a SIM card or a USIM card, is inserted. The mobile phone further includes an antenna 1, a wireless section 2 and a control unit 3. The wireless section 2 modulates and demodulates transmitted and received signals, respectively. The control unit 3 is connected to a memory 4, a display unit 5, an operating unit 6, a speaker 7, a timer 8 and a microphone 9, and controls the entire mobile phone. For the above listed sections, publicly known controls will be performed. The control unit 3 can determine whether an IC card inserted into the IC card insertion portion 10 is a USIM card or a SIM card. Moreover, the control unit 3 verifies an identifier of a mobile phone, such as International Mobile Subscriber Identity (IMSI). The memory 4 can store personal information, such as telephone numbers, email addresses, a communication history, transmission/reception conditions, and the other operation conditions. The control unit 3 determines whether this personal information is stored in the memory 4. A new IC card is authorized by a predetermined operation. Personal information inputted from the operating unit 6 or the like is stored in the memory 4. When the IC card is not inserted in the mobile phone, the control unit 3 halts the operation of the mobile phone or restricts the operation. The memory 4 can further store various operating programs of the mobile phone, and the other information. The mobile phone can includes another control unit performing control concerning the IC card.

Figure 2:
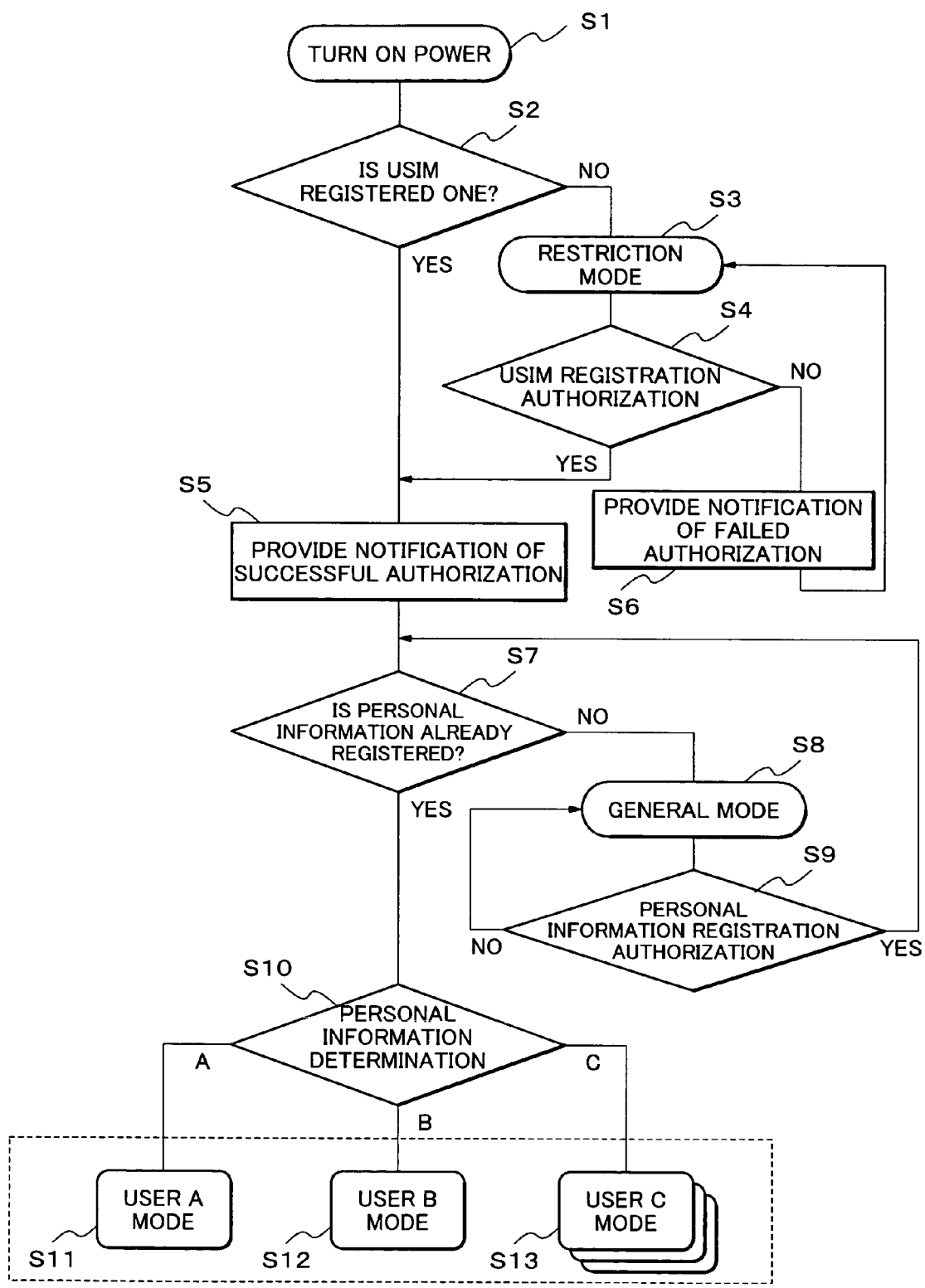
FIG. 2 shows an operation example of the mobile communication terminal of the present invention.

FIG. 2 shows an operation example of the above-described mobile phone. A description will be given below of an example in which the IC card is a USIM card. When the power of the mobile phone is turned on (S1), the control unit 3 determines whether the identification information of the USIM card inserted into the IC card insertion portion 10 is a predetermined identifier such as IMSI, and determines whether the identifier is stored in the memory 4 (S2). If it is determined that the identifier (IMSI) is retained in the memory 4, the control unit 3 provides notification of the identifier (IMSI) and the determination result to a predetermined address or telephone number (S5). If it is determined that the identifier (IMSI) is not retained in the memory 4, the control unit 3 restricts the function of the mobile phone, and set the mobile phone in the SIM/USIM Personalization state (Restriction Mode) (S3). At this time, the control unit 3 enables USIM verification which are standard operations of 3 Generation Partnership Project (3GPP), an emergency call, making a call at a pre-registered telephone number, sending an email to a pre-registered email address, and the like. The control unit 3 disables display of various data stored in the memory 4, and access to these data.

A user performs USIM authorization operation (S4). The control unit 3 determines whether or not the authorization operation has succeeded. For example, a password for USIM-registration authorization is previously stored in the memory 4. The user inputs a password, and the control unit 3 compares the inputted password with the password in the memory 4. If these passwords match each other, the control unit 3 determines that the authorization operation has succeeded, and stores the IMSI of the IC card into the memory 4 (YES in S4). At this time, as described above, the control unit 3 provides notification of the IMSI and the determination result to a predetermined address or telephone number (S5). If the passwords do not match each other (S6), the control unit 3 determines that the authorization operation has failed, and brings the mobile phone back to the Restriction Mode state. Also at this time, the control unit 3 provides notification of the IMSI and the failure result to a predetermined address or telephone number (S6). The communication terminal corresponding to the above-described predetermined address or telephone number is in possession of the administrator of the mobile phone. The administrator can know the current user of the mobile phone, and can set the mobile phone in a certain state by sending a control signal to the mobile phone.

If the IMSI verification has succeeded, the control unit 3 determines whether or not the personal information corresponding to the IMSI is stored in the memory 4 (S7). If the personal information is not stored in the memory 4, the control unit 3 sets the mobile phone in General Mode (S9). At this time, the control unit 3 disables either display of or access to all pieces of the personal information retained in the memory 4 and associated with the IMSI. In the General Mode state, a user can perform operation of personal information authorization (S9). When the user inputs a password, the inputted password is compared with an authorization password previously stored in the memory 4. If the passwords match each other, the personal information authorization will be completed. At this time, if personal information is stored in the USIM card, the personal information will be stored in the memory 4. If the USIM card has no personal information stored therein, the data inputted from the operating unit 6 will be stored in the memory 4 as personal information corresponding to the IMSI of the USIM card. Preferably, the password for the personal information authorization is different from the password for the above-described USIM authorization. If the personal information authorization operation has failed (NO in S9), the mobile phone remains in the aforementioned General Mode.

If the personal information corresponding to the verified IMSI is already stored in the memory 4, or if the above-described password input results in successful personal information authorization, the control unit 3 examines the IMSI of the USIM card currently inserted in the IC card insertion portion 10 (S10) The control unit 3 makes the-personal information stored in the memory 4 in association with the IMSI available, and disables either access to or display of the other personal information. At the same time, the control unit 3 can store, in the memory 4, various data inputted to the mobile phone with the USIM card inserted therein in a state where the data is associated with the IMSI of the USIM card. As shown in FIG. 2, the mobile phone is customized into one of modes S11, S12 and S13, for example. Incidentally, the user can specify certain data out of his/her personal information and allow the data to be disclosed to others by a predetermined operation of the mobile phone.

A description will be given below of a usage example of a mobile phone as a mobile communication terminal of the present invention. In the mobile phone used by a user X, the telephone numbers of an A company, a B company and a C company are registered. The user X hands this mobile phone to a user Y. Although the mobile phone can display the telephone numbers of the A company, the B company and the C company, the user Y wishes to use the telephone numbers of the C company, a D company and an E company. For the user Y, the telephone numbers of the A and B companies are unnecessary data. When the user Y uses the telephone numbers of the D and E companies, these telephone numbers are stored into the memory 4. At the same time, the user Y wishes to make the D-company telephone number the number for his/her exclusive use, and therefore registers the D-company telephone number in the memory 4 in a state where the telephone number is associated with the ISMI of the IC card of the user Y. The user Y takes his/her IC card out of the mobile phone, and hands the mobile phone back to the user X. The user X is notified that the user Y does not use the telephone numbers of the A and B companies. The user X registers the telephone numbers of the A and B companies in the memory 4 as personal information corresponding to the IMSI of his/her IC card. As a result, the user X can use the telephone numbers of the A, B, C and E companies, while the user Y can use the telephone numbers of the C, D and E companies. The telephone numbers of the C and E companies are available in the above-described General Mode state. The users X and Y can individually apply the configuration stored in his/her card to the mobile phone. If the number of telephone numbers commonly used by users is small, the present invention considerably improves the operability of a mobile communication terminal. In addition, users can keep the personal data stored in the memory 4 private.

The notification (the sending of the specific message via an email or a telephone) carried out in S5 and S6 of FIG. 2 may be carried out automatically or manually. When receiving the above notification, the administrator of the mobile phone can send a control signal to the mobile phone. The control signal can configure the functions of the mobile phone, such as a service area and call time, and can select from the previously set function restrictions. Moreover, the notification from the mobile phone to the administrator may be carried out when an IC card is inserted into the IC card insertion portion 10 of the mobile phone.

The mobile phone with the IC card inserted therein can periodically provide notification of the state of the mobile communication terminal (for example, communication charge cumulated since the change of the IC card) to the administrator or a predetermined contact address. In addition, the personal information corresponding to the identifier of the IC card may be downloaded from a predetermined server to the memory 4 via a network.

For the IC card, while a SIM card or a USIM card, for example, may be used, a card in which an ID of a card owner is stored may be used. When an SD card stores a file with an ID recorded therein, the ID in the file can be used as an IMSI. It is also possible that a 2G mobile communication terminal and the like, which does not use the USMI card has a card insertion portion, and carries out the above-described operation of the present invention by using a card having an individual ID as described above. The mobile communication terminal of the present invention is a mobile phone, a Personal Handy phone System (PHS), a Personal Digital Assistant (PDA), or the other mobile communication terminal.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to refrain all equivalents of the claimed invention even if the claims are amended during prosecution.

What is claimed is:

1. A mobile communication terminal performing communication for a user in a state where the user installs a card which stores information therein, the mobile communication terminal comprising:
   a control unit controlling operations of the mobile communication terminal;
   a storage unit;
   determination means for determining whether or not identification information of the card is retained in the storage unit and whether or not personal information corresponding to the identification information is retained in the storage unit;
   configuration means for configuring operations of the mobile communication terminal in accordance with a determination result of the determination means; and
   notification means for providing notification corresponding to the determination result to a predetermined party, which is different from the user;
   wherein, if the identification information of the card is not retained in the storage unit, the configuration means enables an input operation of the identification information and enables communication to the predetermined party, and
   when an input operation is performed, notification of whether or not the input operation has succeeded notification and of the identification information of the card are provided to the predetermined party.

2. The mobile communication terminal according to claim 1,
   wherein the control unit includes at least one of the determination means, the configuration means and the notification means.

3. The mobile communication terminal according to claim 1,
   wherein, if the identification information of the card is retained in the storage unit, the notification means provides: (a) notification that the identification information is retained and (b) the retained identification information, to the predetermined party.

4. The mobile communication terminal according to claim 1,
   wherein, when the determination means determines that the identification information of the installed card is retained in the storage unit, the determination means determines whether the storage unit retains a predetermined personal information corresponding to the identification information.

5. The mobile communication terminal according to claim 4,
   wherein, if the storage unit retains no personal information corresponding to the identification information, the configuration means enables a registration operation of the personal information, and disables disclosure of the other personal information retained in the storage unit.

6. The mobile communication terminal according to claim 5,
   wherein the registration of the personal information is performed by a predetermined input operation of the mobile communication terminal.

7. The mobile communication terminal according to claim 5,
   wherein the registration of the personal information is performed by sending predetermined data from an external device to the mobile communication terminal.

8. The mobile communication terminal according to claim 4,
   wherein, if the storage unit retains personal information corresponding to the identification information, the configuration means configures the mobile communication terminal in accordance with the personal information, and disables disclosure of the other personal information retained in the storage unit.

9. The mobile communication terminal according to claim 4,
   wherein the personal information includes at least one of a telephone number, an email address, a communication history, and a transmission/reception condition.

10. The mobile communication terminal according to claim 4,
    wherein the retained personal information can be separated into disclosable information and undisclosable information to a third party.

11. The mobile communication terminal according to claim 1,
    wherein a control signal sent from the receiver of the notification sets the mobile communication terminal in a predetermined condition.

12. The mobile communication terminal according to claim 1,
    wherein the card is a Subscriber Identity Module (SIM) card.

13. The mobile communication unit according to claim 1,
    wherein the card is a Universal Subscriber Identity Module (USIM) card.

14. A method of operating a mobile communication terminal performing communication for a user in a state where the user installs a card which stores information therein, the method comprising:

determining whether identification information stored in the installed card is retained in a storage unit of the mobile communication terminal;

if it is determined that the identification information is retained in the storage unit, sending an indication of the determination, and the identification information, to a predetermined party, which is different from the user;

determining whether personal information corresponding to the identification information is retained in the storage unit; and if the personal information is retained in the storage unit, configuring the mobile communication terminal in accordance with the personal information, wherein, if the identification information of the card is not retained in the storage unit, the configuring step enables an input operation of the identification information and enables communication to the predetermined party, and when an input operation is performed, notification of whether or not the input operation has succeeded and notification of the identification information of the card are provided to the predetermined party.

15. The method according to claim 14, further comprising:

if no identification information is retained in the storage unit, restricting operations of the mobile communication terminal.

16. The method according to claim 15, wherein, when identification information input operation for the storage unit is performed, the result of whether or not the input operation has succeeded and the identification information are sent to the predetermined party.

17. The method according to claim 14, further comprising:

if the personal information is not retained in the storage unit, disabling disclosure of the other personal information retained in the storage unit, and making the mobile communication terminal usable.

* * * * *